INVENTOR.
John G. Dorward Jr.
BY

Feb. 10, 1959   J. G. DORWARD, JR   2,873,375
THERMALLY OPERATED VAPOR VALVE
Filed Feb. 14, 1946   3 Sheets-Sheet 3

INVENTOR.
John G. Dorward Jr.
BY

United States Patent Office 2,873,375
Patented Feb. 10, 1959

2,873,375

THERMALLY OPERATED VAPOR VALVE

John G. Dorward, Jr., Alameda, Calif., assignor to the United States of America as represented by the United States Atomic Energy Commission Application February 14, 1946, Serial No. 647,438

5 Claims. (Cl. 250—41.9)

This invention relates to the portion of an ionizing mechanism pertinent to the supply and control of vapor to be ionized, and is especially concerned with an ionizing mechanism sometimes termed a "calutron," an example thereof being disclosed in U. S. Patent No. 2,709,222, which issued to Ernest O. Lawrence on May 24, 1955.

One of the important factors in operating a calutron is the regulation of the rate of ionization of the material being processed. The usual manner of ionizing the process material is to pass it in a gaseous form through or into the vicinity of an electric arc within a magnetic field, so that interaction between the arc and the gas results in the production of a quantity of ions of the gaseous material.

Means are customarily provided for maintaining the arc in as steady operation as possible, preferably close to its optimum ionizing condition. It appears that one of the important influences upon the operation of the arc is the rate of supply of vapor or gas for ionization. This is a sufficiently critical factor that many expedients have been resorted to in order to regulate the steadiness of the arc as accurately as possible.

Several schemes for regulating the vapor flow have been proposed and tried, but up to the time of the present invention no readily responsive, critically accurate and simple arrangement has presented itself. This is partly due to the fact that all of the mechanism referred to operates within a vacuum of about $10^{-4}$ millimeters of mercury, and any controlling devices that are mechanically actuated must somehow pass through the wall of the tank, giving rise to problems of sealing, leakage prevention, and maintenance.

It is therefore an object of the invention to provide a means of accurately controlling the steadiness of an arc in a calutron.

Another object of the invention is to provide means for accurately controlling vapor or gas flow in a calutron.

An additional object of the invention is to provide a means, readily regulable from the exterior of the vacuum tank, for controlling vapor flow in a calutron.

A still further object of the invention is to provide means quickly responsive to regulatory changes for controlling vapor flow in a calutron.

A still further object of the invention is to provide means for accurately controlling fluid flow in any fluid-flow system.

Another object of the invention is to provide a valve actuating device effective within a vacuum tank without the transmission of mechanical motion through the wall of the tank.

A still further object of the invention is, in general, to improve valve mechanisms.

A further object of the invention is, in general, to improve calutrons.

Other objects, together with the foregoing, appear from the following description of one embodiment of the invention, such embodiment being illustrated in the accompanying drawings, in which.

Figure 1:
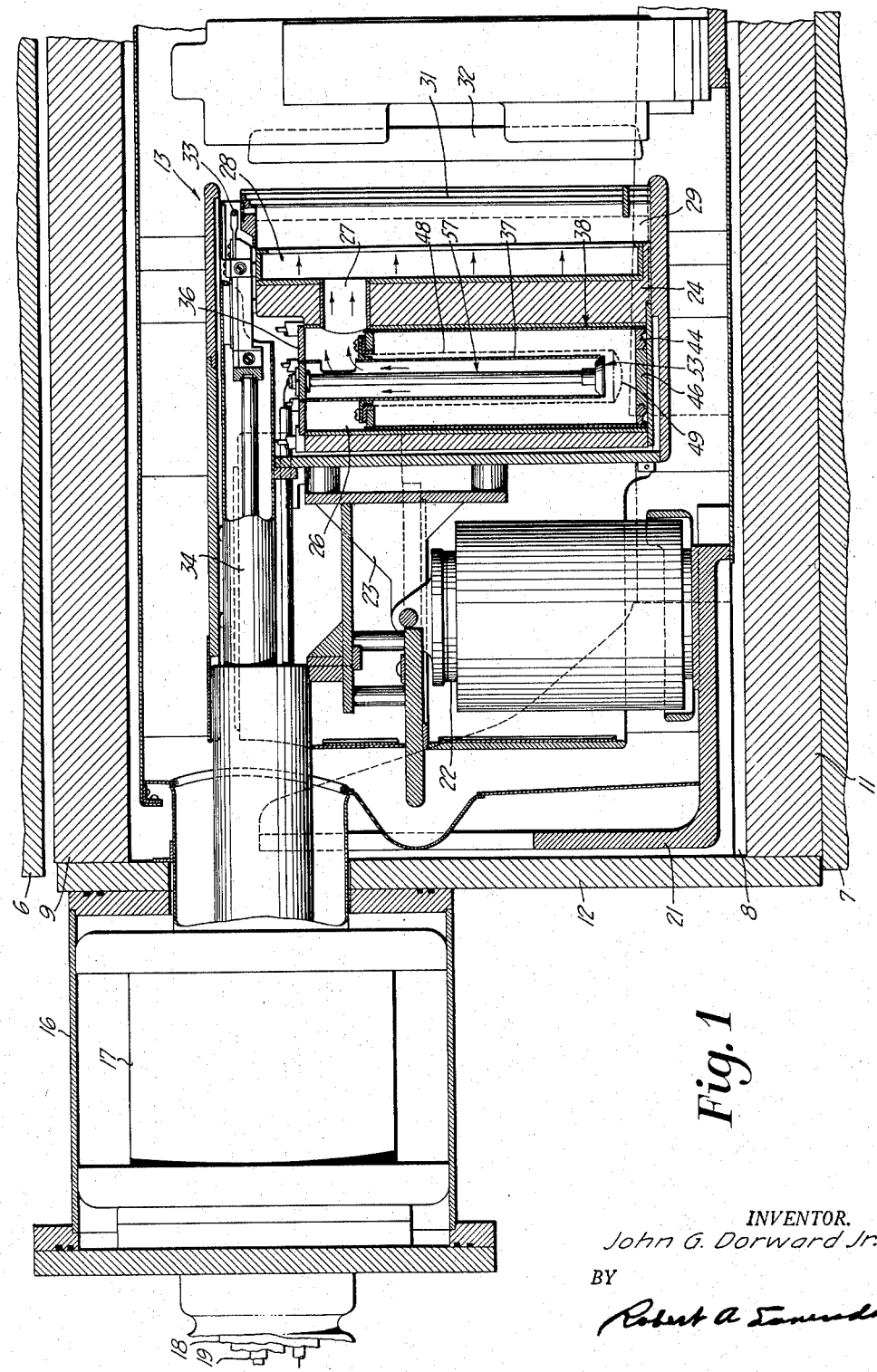
Figure 1 is a cross section on a generally vertical plane of a fragmentary portion of a calutron, the section for the most part being on a median plane to illustrate the internal construction of a calutron source unit incorporating the valve of the invention.
Figure 2:
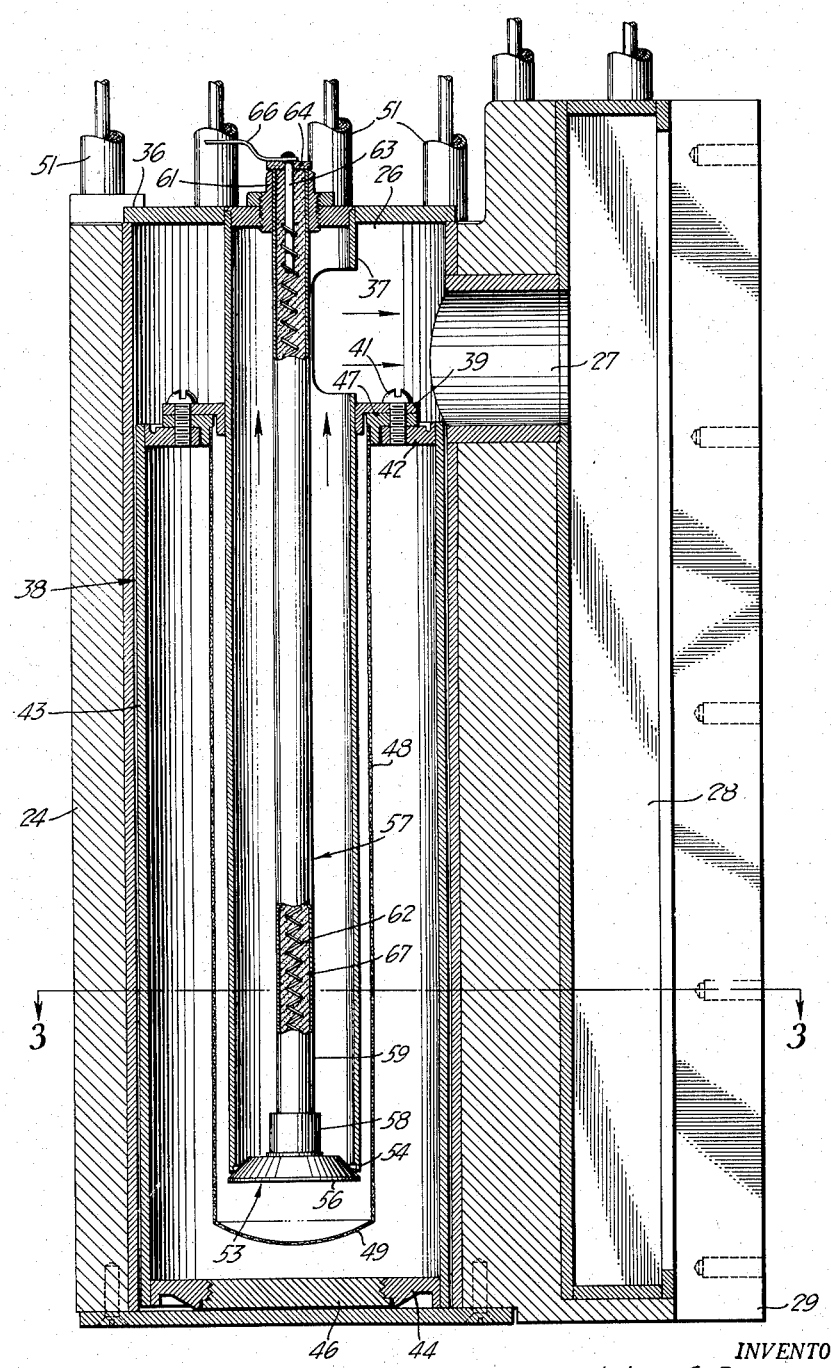
Figure 2 is a cross section on the same plane as Figure 1, but showing to an enlarged scale the charge heating chamber, charge bottle, and vapor valve of the invention.

For a detailed description of a calutron of the general type shown herein in fragmentary form, reference is had to the above-identified patent of Lawrence. Briefly, however, and as illustrated herein, the source portion of such a calutron is for disposition within a magnetic field existing between the poles 6 and 7 of an electromagnet. In this region there is situated an evacuated chamber 8, largely defined by an upper wall 9, a lower wall 11, and a face plate 12. The pressure within the chamber 8 is established and maintained by a suitable evacuating mechanism, not shown. At a suitable point within the chamber there is disposed an ionizing mechanism, generally designated 13. The specific ionizing mechanism is not of consequence to the current invention, so that a generally exemplary form is disclosed. This structure is customarily referred to as a "source" unit. It involves a mounting 16, appropriately secured to the face plate 12 and carrying a stem 17 through which a number of supports 18 and leads 19 extend. These supports and leads are not illustrated in detail herein, as they are a part of the general calutron mechanism not directly concerned with the current disclosure.

Within the chamber 8, the face plate 12 is supplied with a bracket 21 supporting an insulator 22, on which is fastened a mounting arm 23. On the mounting arm is disposed a source block 24, incorporating a charge cavity 26 in communication through a vapor passage 27 with a gas distribution chamber 28, also formed within the charge block 24. The distribution chamber leads to an arc cavity 29 provided with an arc opening 31 opposite accelerating electrodes 32, arranged in the customary fashion. In the present instance, the arc block 24 itself serves as an anode for an arc that is established between the arc block and a filamentary cathode 33 disposed at the inner end of a cathode stem 34 passing through the mounting 16 and provided with appropriate hermetic seals.

In the customary operation of this mechanism, vapor from the chamber 26 flows through the passage 27 and through the distribution chamber 28 into the arc cavity 29. An electric arc extending through such cavity between the block anode 24 and the cathode 33 is effective partially to ionize the passing vapor. The ions are withdrawn with the assistance of the accelerating electrodes 32. It is the control of the vapor passing from the chamber 26 to the arc within the cavity 29 that is of consequence in the present circumstance. To control the rate of flow of such vapor and thereby to regulate the functioning of the arc all in accordance with the present invention, there is provided a valve in the nature of a poppet valve.

One end of the chamber 26 is closed by a removable cover 36, preferably of an electrically conducting material such as metal, in good electrical contact, when in closed position, with the material of the source block so that a ground or electric connection on the source block is effective to include the cover 36 in the same circuit, Secured to and depending from the cover 36 is a metallic tube 37, disposed substantially coaxially with the walls of the chamber 26 and extending for nearly, but not quite, the entire length of such chamber. The tube 37 itself is of thermally conducting material, such as a metal, having a well-known coefficient of thermal expansion.

Preferably, the tube 37 acts as an anchor or support for a charge bottle 38 containing the material to be processed or vaporized. To this end, the tube 37 is extended by a flange 39 carrying a plurality of fasteners 41, also engaging an annular end 42 of the charge bottle 38. The end 42 is suitably sealed to a circular, cylindrical charge bottle body 43, itself carrying an internally threaded head 44. A plug 46 is threaded into the head 44 and is readily removable to afford access to the interior of the charge bottle 38.

While it may not be necessary in the event the charge is of a liquid or gaseous form under normal conditions, it is still advisable to have some means for positioning a pulverulent charge material away from the immediate vicinity of the end of the valve tube 37. For that reason, there is clamped between the flange 39 and the end 42 an intermediate collar 47, held in place by the fastenings 41 and carrying a depending, foraminous, circular cylindrical tube 48, at its free end closed by a foraminous disk 49, thus forming a thimble completely protecting the depending tube 37 from the contents of the charge bottle 38 until or unless such contents are in liquid or gaseous form.

Figure 3:
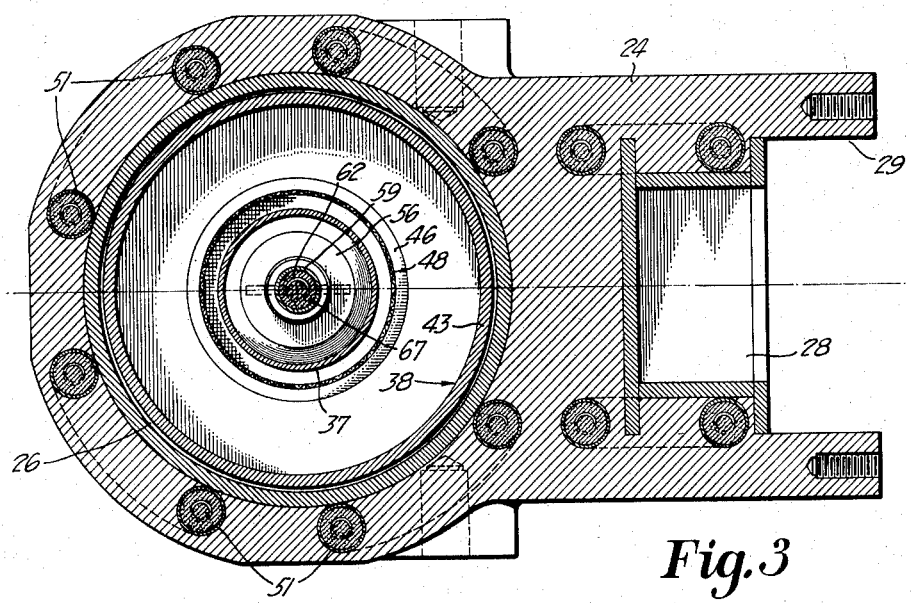
Figure 3 is a cross section, the plane of which is indicated by the line 3—3 of Figure 2.
Figure 4:
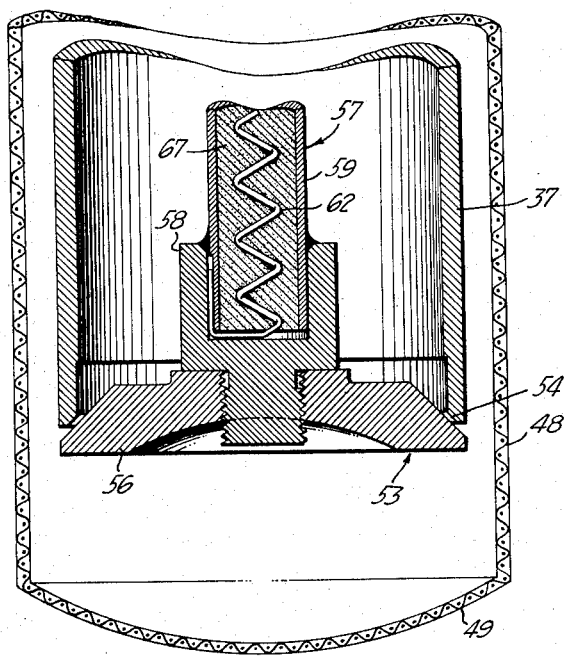
Figure 4 is a cross section on the same plane as that of Figures 1 and 2, showing to a greatly enlarged scale the valve head, valve seat, and their immediate environment.

In accordance with the usual practice, the contents of the charge bottle 38 are converted from a solid, granular, or pulverulent form into a vapor or gaseous form by heat. In the present instance, the source block 24, especially as shown in Figure 3, is provided with an electrically energized heating coil 51, effective to transmit heat to the encompassing material of the source block, from whence it is transferred to the contents of the charge bottle 38 in a sufficient amount to give rise to the generation of gas or vapor within the charge bottle and to tend to cause flow through the foraminous tube 48.

In accordance with the present invention, the flow of gas from the charge bottle is precisely regulated by a poppet valve, generally designated 53. This valve includes a valve seat 54, formed at the terminus of the tube 37, with which cooperates a poppet valve head 56 of truncated, conical form, adapted to move axially relative to the valve seat 54. When the valve head 56 approaches the valve seat 54, it reduces the area available for flow therebetween until such time as the head abuts the valve seat 54, whereupon flow therebetween is completely interrupted. As the valve head moves away from the seat, the area available for gas flow is increased and the flow likewise increases in some proportion thereto.

The valve head 56 is positioned with respect to the seat 54 by a valve stem, generally designated 57. This is made up of a theaded ferrule 58, screwed into the valve head 56 and capping the terminus of a stem tube 59, fabricated of a material, such as a metal, having a well-known thermal expansion coefficient, and effective readily to transmit heat. The stem tube 59 extends coaxially through the tube 37 and is fastened thereto at one end by a sleeve and jam nut assembly 61.

Particularly in accordance with the present invention, there is provided a means for supplying heat to the thermally-responsive valve stem 57. For this reason, there is located within the tube 59 a helix of electric heating wire 62, at one end jammed between the tube 59 and the ferrule 58 for good electrical contact therewith and at its other end united to a conducting stem 63 passing through an insulating disk 64 and connected to an electric conductor 66, in turn passing through the supporting mechanisn 17 to the exterior of the structure. To assist in maintaining electrical isolation between the coil 62 and the conducting tube 59, the tube is filled with an insulating powder 67.

In this fashion, it is possible, by including the source block 24 and the conductor 66 in the same circuit, to establish a regulated current flow through the heating coil 62, and by varying the current flow to vary the temperature of the coil and thereby the temperature of the stem 57. If the temperature of the stem is changed to or maintained at some predetermined value with respect to the temperature of the tube 37, a differential motion or spacing between the valve head 56 and the valve seat 54 is thermally induced, so that the annular orifice for gas flow between the valve head and seat is then a function of the current flowing in the electrical heating circuit. It then becomes a simple matter, by altering the current flow in the heating circuit, to alter the vapor flow through the tube 37.

It is to be remembered that when the valve 53 is opened there is a gas flow through the tube 37 and along the stem 57, and that the temperature of the flowing gas or vapor is somewhat less than the temperature induced in the stem 57 by the interior electric heater. Thus to maintain steady conditions it is necessary, since heat is at all times being carried away from the stem 57, to make up at least the loss of heat by supplying additional heat through the heating coil 62. The rate at which heat is supplied to the vapor from the stem does not sensibly or importantly change the temperature of the vapor from the aspect of the remaining processing, but is sufficient to promptly reduce the temperature of the stem 57 so that upon reduction or interruption of the current supply to the heating coil 62, the valve head 56 very promptly approaches the valve seat 54, and quickly produces a corresponding change in the vapor flow to the arc.

In accordance with the invention, therefore, there is provided a means readily regulable from the exterior of the vacuum tank, without mechanical transmission of force, for the quick and accurate control of the ionizing arc by a corresponding control of gas flow thereto. The result is to produce an effective way of carefully regulating the operation of an ionizing mechanism, such as a calutron, and to produce a general improvement in the operation of the structure.

What is claimed is:

1. A caultron comprising a charge bottle, a tube secured to and extending into said charge bottle, a valve seat on said tube, a valve head adapted to cooperate with said seat, a valve stem secured to said tube and to said valve head, and means for thermally varying the length of said stem to regulate the relative position of said valve head and said valve seat to control the flow of charge from said charge bottle.

2. A calutron comprising a charge heating chamber, a charge bottle fitting within said chamber, said bottle being adapted to contain a charge convertible to vapor by the heat from said heating chamber, a thermally-responsive valve for controlling the efflux of said vapor from said bottle, and an individually controllable heating means for energizing said thermally-responsive valve.

3. A calutron comprising a charge bottle adapted to contain a grannular charge material, a foraminous thimble disposed within said charge bottle for defining a central charge-free cavity therein, a vapor-conducting tube extending into said cavity, said tube being provided with a valve seat, a valve head adapted to cooperate with said seat, a thermally-responsive stem secured to said valve head passing through said tube and secured thereto, and means for heating said stem to produce differential movement of said valve head and said valve seat to control the flow of said vapor from said charge bottle.

4. A calutron comprising a charge bottle adapted to contain a charge convertible to vapor by the application of heat thereto, a thermally-responsive valve for controlling the efflux of said vapor from said bottle, and heating means controllable separately from the application of heat to said charge for energizing said thermally-responsive valve.

5. A calutron comprising a closed tank having a wall, means for evacuating said tank, a source of vapor within said tank, means within said tank for ionizing said vapor, means within said tank for conducting vapor from said source to said ionizing means, a valve within said tank for controlling flow through said conducting means, thermally-responsive means within said tank for actuating said valve, an electric heater within said tank for supplying heat to said thermally-responsive means, and electric conductors passing through the wall of said tank and included in an electrical circuit with said heater for supplying energy to said heater from outside of said tank.

References Cited in the file of this patent
UNITED STATES PATENTS

| | | |
|---|---|---|
| 1,697,432 | Martin | Jan. 1, 1929 |
| 2,341,551 | Hoover | Feb. 15, 1944 |
| 2,597,653 | Smith | May 16, 1950 |